(12) United States Patent
Momose et al.

(10) Patent No.: US 11,890,900 B2
(45) Date of Patent: Feb. 6, 2024

(54) TRANSMITTER

(71) Applicant: PACIFIC INDUSTRIAL CO., LTD., Ogaki (JP)

(72) Inventors: Akira Momose, Hashima (JP); Yasuhisa Tsujita, Motosu (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 550 days.

(21) Appl. No.: 16/623,949

(22) PCT Filed: Dec. 26, 2018

(86) PCT No.: PCT/JP2018/047842
§ 371 (c)(1),
(2) Date: Dec. 18, 2020

(87) PCT Pub. No.: WO2020/136757
PCT Pub. Date: Jul. 2, 2020

(65) Prior Publication Data
US 2023/0191854 A1 Jun. 22, 2023

(51) Int. Cl.
*B60C 23/04* (2006.01)
(52) U.S. Cl.
CPC ........ *B60C 23/041* (2013.01); *B60C 23/0442* (2013.01); *B60C 23/0447* (2013.01)
(58) Field of Classification Search
None
See application file for complete search history.

(56) References Cited

U.S. PATENT DOCUMENTS

| 3,658,152 A | 4/1972 | Mueller |
| 3,843,586 A | 10/1974 | Wolf |
| 2009/0102633 A1 | 4/2009 | Ebinuma et al. |
| 2010/0060109 A1* | 3/2010 | Russell ................ H10N 30/857 29/25.35 |
| 2016/0052351 A1* | 2/2016 | Dilisio .............. B60C 23/00372 137/224 |

(Continued)

FOREIGN PATENT DOCUMENTS

| EP | 1605162 A2 | 12/2005 |
| JP | 5219121 B2 | 4/2009 |

(Continued)

OTHER PUBLICATIONS

Extended Search Report issued in European Application No. 18922107.0-1012 dated Oct. 22, 2020; 7 pages.

(Continued)

*Primary Examiner* — Santiago Garcia
(74) *Attorney, Agent, or Firm* — CANTOR COLBURN LLP

(57) ABSTRACT

The transmitter is arranged in a tire attached to a wheel and configured to transmit data to a receiver. The transmitter includes an obtaining section configured to obtain a detection result of the sensor, a generating section configured to generate the data including the detection result of the sensor, a transmitting section configured to transmit the data generated by the generating section, and an organic power generation element that is a power source of the transmitter. The organic power generation element is configured to generate power through a chemical reaction with organic matter contained in a fuel solution accommodated in the tire.

8 Claims, 5 Drawing Sheets

(56) References Cited

U.S. PATENT DOCUMENTS

| | | | |
|---|---|---|---|
| 2019/0077311 A1* | 3/2019 | Ali | B60R 13/02 |
| 2020/0189326 A1* | 6/2020 | Sethi | B60C 11/243 |
| 2021/0028725 A1* | 1/2021 | Griswold | B60C 23/0411 |
| 2021/0229503 A1* | 7/2021 | Stowell | B60C 23/064 |

FOREIGN PATENT DOCUMENTS

| | | |
|---|---|---|
| JP | 5572429 B2 | 7/2014 |
| JP | 2017213948 A | 12/2017 |
| JP | 2018068287 A | 5/2018 |
| KR | 20150001057 U | 3/2015 |

OTHER PUBLICATIONS

Horton, Will: "Inflating a tyre with WD40," Sep. 23, 2014, XP054980954, Retrieved from the Internet: URL:https://www.youtube.com/watch?v=SoB-KwKp6ug: [retrieved Oct. 2, 2020]; 1 page.

Kenya Hayashi et al., IEICE Trans Electron vol. E102-C No. 7, "A385x385 µm² 0.165V 0.27nW Fully-Integrated Supply-Modulated OOK Transmitter in 65nm COMS for Glass-Free, Self-Powered, and Fuel-Cell-Embedded Continuous Glucose Monitoring Contact Lens," Jul. 2019; 5 pages.

Non-Final Office Action dated May 27, 2021 for U.S. Appl. No. 16/625,303.

First Office Action for Chinese Appliction No. 201880043082.4 and its machine translation dated Nov. 23, 2021.

Rare Earth Catalytic Materials, Wu Xiaodong, China Railway Press, Jun. 30, 2017.

* cited by examiner

TRANSMITTER

TECHNICAL FIELD

The present invention relates to a transmitter.

BACKGROUND

To monitor the condition of a tire, a vehicle includes a tire condition monitoring apparatus. The tire condition monitoring apparatus includes transmitters, which are respectively attached to the wheel assemblies, and a receiver. The transmitter includes a pressure sensor, which detects the pressure of the tire, and a transmitting section. The transmitting section transmits the detection result of the pressure sensor to the receiver. This allows the receiver to monitor the pressure of the tire.

Patent Document 1 describes an example in which a power generation element is used as the power source of a transmitter. The transmitter of Patent Document 1 includes a power generation device using a magnetostrictor as a power generation element. The magnetostrictor generates power by utilizing an inverse magnetostrictive effect in which a magnetic field is changed by changing the outer form of the magnetostrictor with impact. The power generation device includes a collision member that applies the impact to the magnetostrictor.

PRIOR ART DOCUMENT

Patent Document

Patent Document 1: Japanese Laid-Open Patent Publication No. 2017-213948

SUMMARY OF THE INVENTION

Problems that the Invention is to Solve

When the magnetostrictor is used as the power generation element, the collision member needs to be arranged in a movable manner in order to apply impact to the magnetostrictor. Thus, when the collision member repeatedly moves, a fault easily occurs in the power generation device. When a fault occurs in the power generation device, the transmitter cannot be operated. In such a manner, the transmitter including a movable member has an inferior durability.

It is an objective of the present invention to provide a transmitter capable of limiting a decrease in durability.

Means for Solving the Problem

To solve the above-described problem, a first aspect of the present invention provides a transmitter arranged in a tire attached to a wheel and configured to transmit data to a receiver. The transmitter includes an obtaining section configured to obtain a detection result of the sensor, a generating section configured to generate the data including the detection result of the sensor, a transmitting section configured to transmit the data generated by the generating section, and an organic power generation element that is a power source of the transmitter. The organic power generation element is configured to generate power through a chemical reaction with organic matter contained in a fuel solution accommodated in the tire.

The transmitter operates with power generated by the power generation element. The tire attached to the wheel has an inner space into which gas is introduced. By using the inner space as a reservoir space for fuel solution, the organic power generation element can generate power. The power generation element generates power through a chemical reaction with organic matter contained in the fuel solution. Thus, the power generation element can generate power without arranging a movable member like when a magnetostrictor is used. This eliminates the need for a movable member in order to generate power. Thus, a decrease in the durability of the transmitter is limited.

In the above-described transmitter, organic matter may include a reducing sugar.

In the above-described transmitter, the tire may include a tread portion having a grounding surface and a rear surface located at a side opposite from the grounding surface, and the transmitter may be arranged on the rear surface of the tread portion.

When traveling of the vehicle rotates the tire, the centrifugal force causes the fuel solution to flow. The fuel solution flows along the rear surface of the tread portion of the tire. Thus, when the transmitter is arranged on the rear surface of the tread portion, the fuel solution is easily supplied to the organic power generation element.

In the above-described transmitter, the tire may include a fuel passage through which the fuel solution passes, and the organic power generation element may be arranged in contact with the fuel solution passing through the fuel passage.

By arranging the organic power generation element in contact with the fuel solution passing through the fuel passage, the fuel solution can be easily supplied to the organic power generation element.

In the above-described transmitter, the tire may include a retainer that retains the fuel solution, and the organic power generation element may be arranged along the retainer.

By retaining the fuel solution with the retainer, the fuel solution can be easily supplied to the power generation element.

In the above-described transmitter, the generating section may be configured to generate the data including information related to a power generation amount of the organic power generation element.

The data includes information related to the power generation amount of the power generation element. This allows the receiver to recognize the information related to the power generation amount of the power generation element.

In the above-described transmitter, the transmitter may include a determining section that determines whether the power generation amount of the organic power generation element is below a threshold value. When the determining section determines that the power generation amount of the organic power generation element is below the threshold value, the generating section may generate the data including information indicating that the power generation amount is below the threshold value.

The receiver is caused to recognize that the power generation amount of the power generation element is below the threshold value.

Effects of the Invention

The present invention limits a decrease in the durability.

MODES FOR CARRYING OUT THE INVENTION

A transmitter according to an embodiment will now be described.

Figure 1:
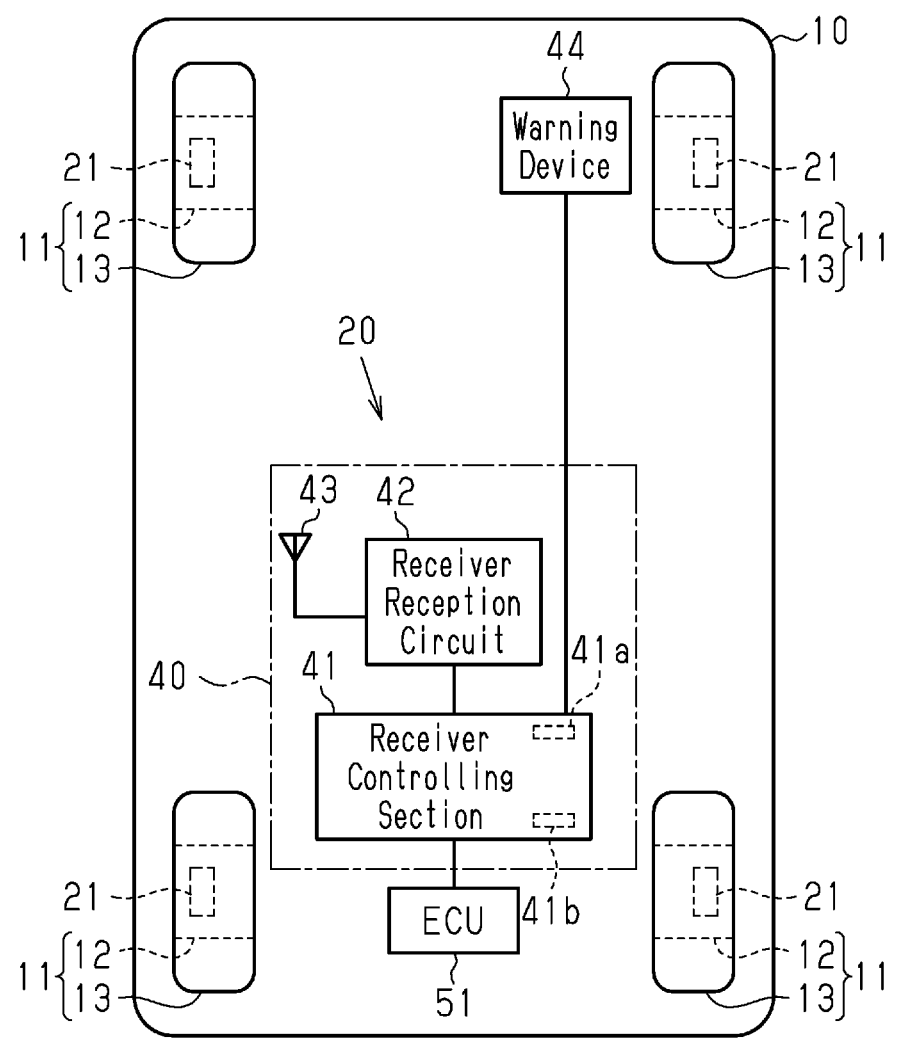
FIG. 1 is a schematic diagram of a tire condition monitoring apparatus.

As shown in FIG. 1, a tire condition monitoring apparatus 20 includes transmitters 21 and a receiver 40. Each transmitter 21 is configured to be attached to one of the four wheel assemblies 11 of a vehicle 10. The receiver 40 is installed in the vehicle 10. Each of the wheel assemblies 11 includes a wheel 12 and a tire 13, which is attached to the wheel 12.

Figure 2:
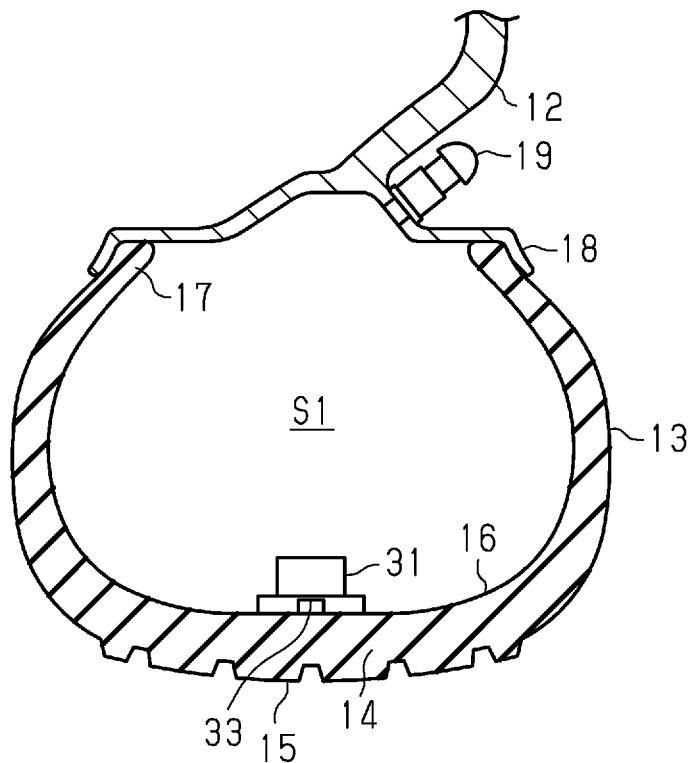
FIG. 2 is a cross-sectional view of the tire attached to the wheel.

As shown in FIG. 2, a bead 17 of the tire 13 is fitted into a rim 18 of the wheel 12 to attach the tire 13 to the wheel 12. The tire 13, which is attached to the wheel 12, has an inner space S1, into which gas is introduced. The inner space S1 is a region surrounded by the tire 13 and the wheel 12. The outer surface of a tread portion 14 is a grounding surface 15, which is in contact with a road surface. The grounding surface 15 is a surface located opposite from a surface of the tread portion 14 that defines the inner space S1. A tire valve 19, which is used to introduce gas into the tire 13 from the outside of the tire 13, is attached to the wheel 12.

The transmitter 21 detects the condition of the corresponding tire 13, for example, the air pressure and internal temperature of the tire 13 and wirelessly transmits a signal including the detection results to the receiver 40. The tire condition monitoring apparatus 20 monitors the conditions of the tires 13 by receiving signals transmitted from the transmitters 21 at the receiver 40.

Figure 3:
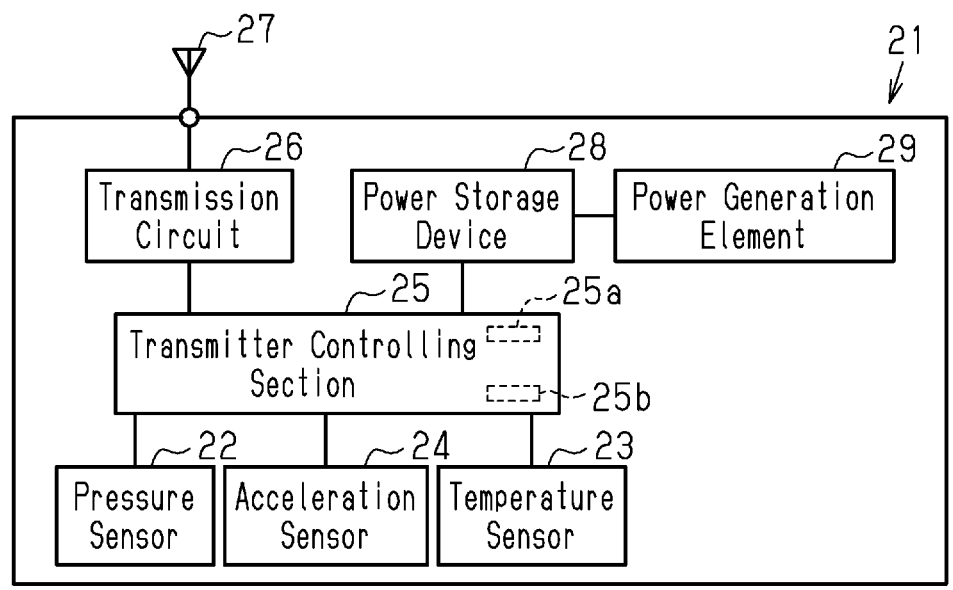
FIG. 3 is a schematic diagram of the transmitter.

As shown in FIG. 3, the transmitter 21 includes a pressure sensor 22, a temperature sensor 23, an acceleration sensor 24, a transmitter controlling section 25, a transmission circuit 26, a transmission antenna 27, a power storage device 28, and a power generation element 29.

The pressure sensor 22 detects the pressure of the corresponding tire 13. The pressure sensor 22 outputs the detection result to the transmitter controlling section 25. The temperature sensor 23 detects the internal temperature of the corresponding tire 13. The temperature sensor 23 outputs the detection result to the transmitter controlling section 25.

In the present embodiment, the acceleration sensor 24 is a three-axis acceleration sensor 24, which includes three detection axes. The acceleration sensor 24 individually detects accelerations relative to the directions in which the three detection axes are oriented. The three detection axes are respectively referred to as the X-axis, Y-axis, and Z-axis. When the acceleration sensor 24 is located at the lowermost position in the vertical direction of the tire 13, the X-axis is oriented in the front-rear direction of the vehicle 10, the Y-axis is oriented in the direction of the rotation axis of the tire 13, and the Z-axis is oriented downward in the vertical direction. In the X-axis, a component force of a gravitational acceleration that acts on the X-axis as the tire 13 rotates is detected. In the Y-axis, a lateral acceleration, which is an acceleration relative to a vehicle width direction, is detected. In the Z axis, a centrifugal acceleration is detected. In the present embodiment, the pressure sensor 22, the temperature sensor 23, and the acceleration sensor 24 function as sensors.

The power generation element 29 is an organic power generation element. The power generation element 29 is an element that generates power through a chemical reaction and is a biofuel cell. The power generation element 29 can generate power using organic matter as fuel. Organic matter includes, for example, reducing sugars such as glucose, substances having an aldehyde group, and alcohols. In the present embodiment, glucose, which is one type of reducing sugars, is used as fuel. The power generation element 29 is a glucose power generation element.

The power storage device 28 is a device such as a secondary battery or a capacitor that can store power generated by the power generation element 29. The power storage device 28 is charged when the power generation element 29 generates power. The power storage device 28 is discharged when the transmitter 21 operates. The transmitter 21 operates with power generated by the power generation element 29 via the power storage device 28. The power generation element 29 is the power source of the transmitter 21.

The power generated by the power generation element 29 can be stored in various manners. For example, the power generated by the power generation element 29 may be used to operate the transmitter 21 such that the power storage device 28 is charged with the remaining power. In this case, when the transmitter 21 cannot be operated with the power generated by the power generation element 29, the power of the power storage device 28 is used to operate the transmitter 21. Alternatively, the power of the power storage device 28 may be used to operate the transmitter 21, and the power generation element 29 may be set as a dedicated element for charging the power storage device 28.

The transmitter controlling section 25 is composed of circuitry such as a microcomputer including, for example, a CPU 25*a*, a memory section 25*b* (such as a RAM and a ROM), an input-output control circuit, and an A/D converter. The transmitter controlling section 25 executes various types of software to control operation of the transmitter 21. In the memory section 25*b*, an ID code is registered, which is identification information unique to each transmitter 21. The memory section 25*b* stores various programs for controlling the transmitter 21.

The transmitter controlling section 25 may include dedicated hardware (application specific integrated circuit: ASIC) that executes at least part of various processes. That is, the transmitter controlling section 25 may be circuitry including 1) one or more processors that operate according to a computer program (software), 2) one or more dedicated hardware circuits such as an ASIC, or 3) a combination thereof. The processor includes a CPU and memory such as a RAM and ROM. The memory stores program codes or instructions configured to cause the CPU to execute processes. The memories, or computer readable media, include any type of media that are accessible by general-purpose computers and dedicated computers.

The transmitter controlling section 25 obtains the detection results of the pressure sensor 22, the temperature sensor 23, and the acceleration sensor 24. The transmitter controlling section 25 functions as an obtaining section. The transmitter controlling section 25 detects a road surface state, which is the state of a road surface where the vehicle 10 is traveling, from the detection result of the acceleration sensor 24. In the present embodiment, description will be made on an example in which cracks and steps on the road surface are detected. In the X-axis of the acceleration sensor 24, only a change in a gravitational acceleration that occurs when the tire 13 rotates is theoretically detected. The acceleration detected in the X-axis changes between +1G to −1G in a single rotation of the tire 13. In the Y-axis of the acceleration sensor 24, an acceleration is not detected when the vehicle 10 is traveling in a straight line. The acceleration detected in the X-axis resulting from the attachment accuracy of the acceleration sensor 24 includes a centrifugal acceleration and a component in the vehicle width direction, and the acceleration detected in the Y-axis includes a component of a centrifugal acceleration and a gravitational acceleration.

When the vehicle 10 passes through a crack, a step, and the like, the wheel assembly 11 enters the crack or falls from the step, thereby generating a downward acceleration. Further, when the vehicle 10 escapes from the crack or goes up on the step, an upward acceleration acts. The upward and downward movement of the vehicle 10 as the vehicle 10 passes through the crack or the step is detected as the acceleration in the X-axis. The acceleration in the X-axis abruptly changes for a short period of time. Thus, a threshold value is set for a change amount of the acceleration in the X-axis per unit of time, and whether the road surface has a crack or a step can be determined by determining whether the change amount exceeds the threshold value. Additionally, when the vehicle 10 moves in the left-right direction due to a crack or a step or when the driver moves the vehicle 10 in the left-right direction to avoid the crack or the step, the acceleration in the Y-axis abruptly changes. Thus, in the same manner as the X-axis, the road surface state can be detected using the acceleration in the Y-axis.

The transmitter controlling section 25 can calculate the friction coefficient of the road surface from the acceleration relative to the traveling direction of the vehicle 10 and from the lateral acceleration. In this manner, the road surface state can be detected by using the detection result of the acceleration sensor 24.

The acceleration in the Z-axis is used to determine whether the vehicle 10 is traveling. The acceleration in the Z-axis increases in proportion to the speed of the vehicle 10. This allows the transmitter controlling section 25 to determine whether the vehicle 10 is traveling from the acceleration in the Z-axis.

The transmitter controlling section 25 can calculate the amount of power generated by the power generation element 29. The amount of power generated by the power generation element 29 can be calculated in various manners. For example, the power generation amount can be calculated by dividing the voltage generated through the power generation of the power generation element 29 and inputting the divided voltage to the transmitter controlling section 25 or by sensing current generated by the power generation element 29 with a current sensor.

The transmitter controlling section 25 generates data and outputs it to the transmission circuit 26. The transmitter controlling section 25 functions as a generating section. The transmission circuit 26, which functions as a transmitting section, modulates the data from the transmitter controlling section 25 to generate a signal (radio frequency (RF) signal) and transmits the signal through the transmission antenna 27.

Figure 4:
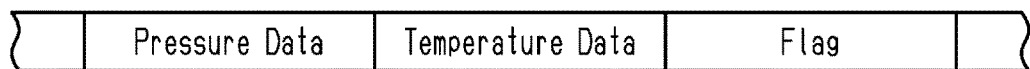
FIG. 4 is a schematic diagram of data transmitted from the transmitter.

As shown in FIG. 4, the data of the present embodiment includes pressure data, temperature data, and a flag. The data also includes an ID code and information indicating a road surface state. The pressure data indicates a pressure value detected by the pressure sensor 22, and the temperature data indicates a temperature detected by the temperature sensor 23. The flag is data indicating information related to the amount of power generated by the power generation element 29. The flag is one-bit data in which the value is reversed when the power generation amount of the power generation element 29 is below the threshold value. The threshold value is set to be larger than the amount of power that is needed to operate the transmitter 21. That is, the threshold value is set such that information indicating insufficiency of the power generation amount of the power generation element 29 can be transmitted before the power generation amount falls below the amount of power needed to operate the transmitter 21.

When the power generation amount of the power generation element 29 falls below the threshold value, the transmitter controlling section 25 reverses the value of the flag from a value obtained when the power generation amount is not below the threshold value. The transmitter controlling section 25 functions as a determining section.

Figure 5:
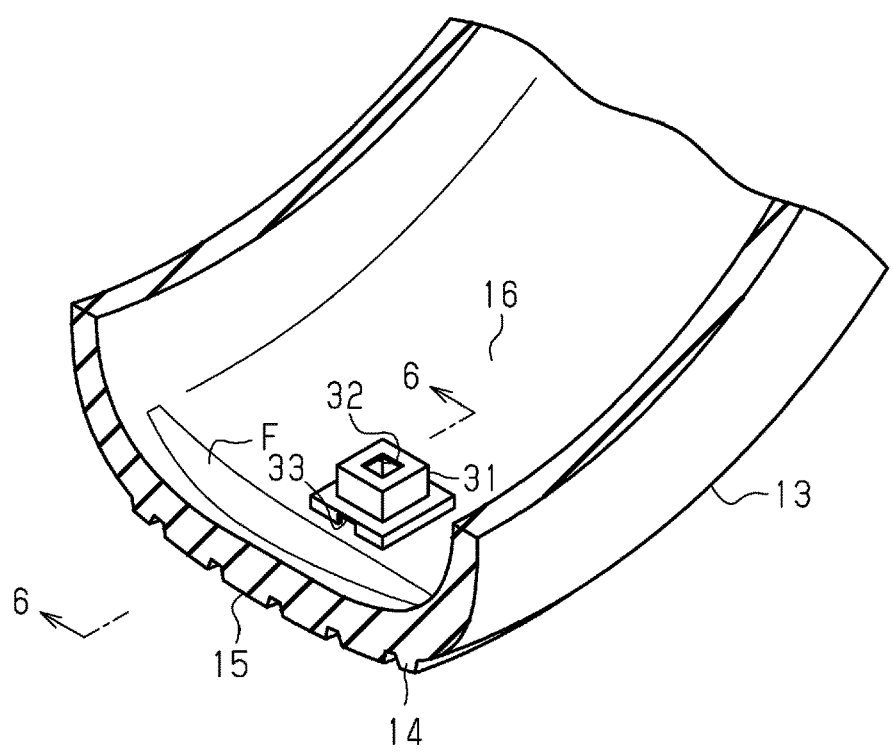
FIG. 5 is a perspective view of an attachment portion arranged on the tire.
Figure 6:
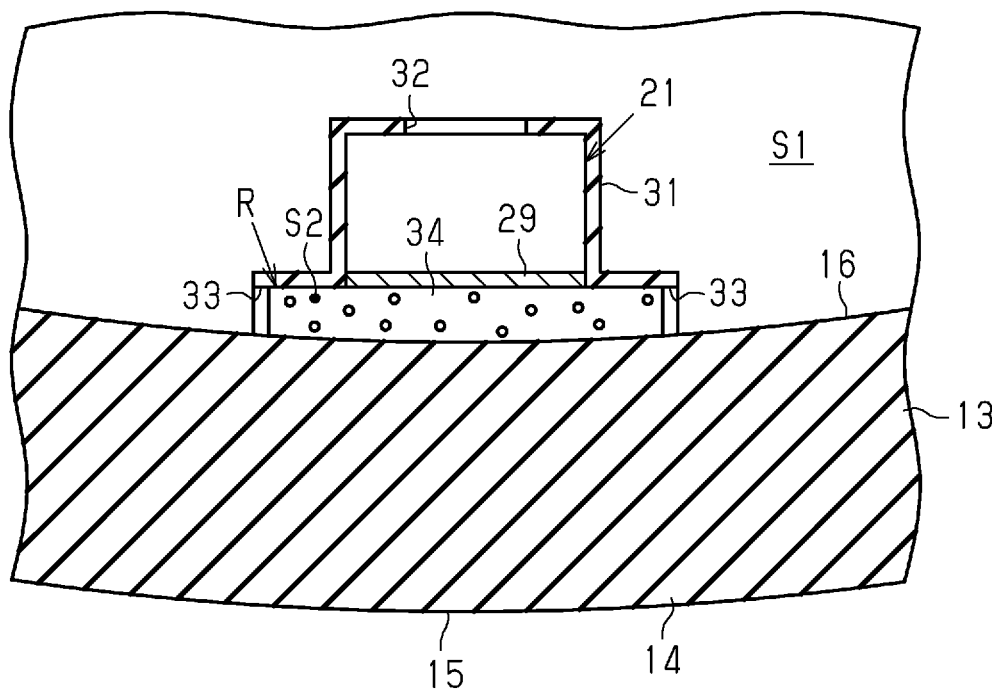
FIG. 6 is a cross-sectional view of the attachment portion.

As shown in FIGS. 5 and 6, the transmitter 21 of the present embodiment is attached to a rear surface 16 of the tread portion 14 of the tire 13, which is located on a side opposite from the grounding surface 15. More specifically, the tire 13 includes a hollow attachment portion 31, which is used to attach the transmitter 21 to the tire 13, and the attachment portion 31 accommodates the transmitter 21. The attachment portion 31 protrudes from the rear surface 16 of the tread portion 14 toward the central axis of the tire 13. The attachment portion 31 may be arranged integrally with the tread portion 14 of the tire 13. Alternatively, the attachment portion 31 may be formed by attaching a component separate from the tread portion 14 of the tire 13 to the tread portion 14.

The attachment portion 31 has an insertion hole 32, through which the transmitter 21 is inserted into the attachment portion 31. The insertion hole 32 connects the inside and outside of the attachment portion 31. The attachment portion 31 has two openings 33, which are laid out in the circumferential direction of the tire 13. Each of the two openings 33 extends in the layout direction of the two openings 33. The layout direction of the two openings 33 includes a direction in which the openings 33 extend in parallel to the circumferential direction of the tire 13 and a direction in which the openings 33 are inclined with respect to the circumferential direction of the tire 13 when the openings 33 are viewed in the radial direction of the tire 13. For example, when the openings 33 are viewed in the radial direction of the tire 13, the openings 33 may be inclined at an angle of less than 45 degrees with respect to the circumferential direction of the tire 13.

The openings 33 are two holes extending through portions of the attachment portion 31 that face each other in the circumferential direction. The openings 33 may have any shape. For example, the openings 33 may be holes having a fixed cross-sectional area or holes of which the cross-sectional area decreases from the outside to the inside of the attachment portion 31. It is preferred that the openings 33 be arranged at positions of the attachment portion 31 that are maximally close to the rear surface 16 of the tread portion 14. In the present embodiment, the openings 33 are arranged in contact with the rear surface 16 of the tread portion 14.

The attachment portion 31 includes a retainer 34. The retainer 34 is a member made of a porous material such as sponge or a member having water absorbency such as a high-molecular absorption body. The retainer 34 is arranged in the attachment portion 31 along the rear surface 16 of the tread portion 14. The retainer 34 extends between the openings 33. That is, the retainer 34 extends in the circumferential direction of the tire 13 from one of the openings 33 to the other one of the openings 33.

The power generation element 29 generates power through a chemical reaction with a fuel solution F, which is accommodated in the inner space S1. The fuel solution F is a solution in which the fuel of the power generation element 29 is dissolved into a solvent. The wheel 12 and the tire 13 are sealed to prevent the leakage of gas from the inner space S1. Thus, the inner space S1 can be used as a reservoir space that stores the fuel solution F.

The power generation element 29 allows for power generation using the fuel solution F and is thus able to contact the fuel solution F. For example, most of the members configuring the transmitter 21 are accommodated in a case and molded with resin, thereby preventing most of the members from contacting the gas in the tire 13. By contrast, at least part of the power generation element 29 is exposed to the outside of the case. The power generation element 29 is located to hold the retainer 34 between the power generation element 29 and the rear surface 16 of the tread portion 14. The power generation element 29 is arranged along the retainer 34.

In the attachment portion 31, the region where the retainer 34 is arranged is referred to as an accommodation region S2. The fuel solution F can pass through the accommodation region S2 via the retainer 34. The two openings 33 connect the accommodation region S2 to the outside of the attachment portion 31. The two openings 33 and the accommodation region S2 define a fuel passage R, through which the fuel solution F passes.

Figure 7:
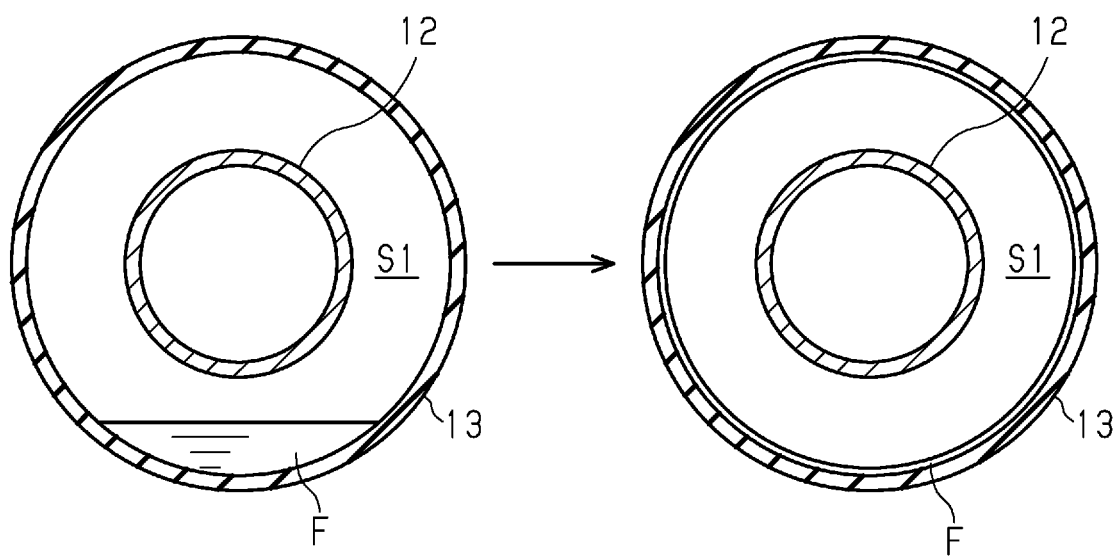
FIG. 7 is a diagram of a fuel solution when the vehicle is stopped and when the vehicle is traveling.

As shown in FIG. 7, when the vehicle 10 is stopped, that is, when the tire 13 is not rotating, the fuel solution F is stored at the vertically lower part of the inner space S1 of the tire 13. When the vehicle 10 is traveling, that is, when the tire 13 is rotating, the centrifugal force presses the fuel solution F to the inner circumferential surface of the tire 13. Thus, the fuel solution F flows so as to form a film over the entire circumference of the inner circumferential surface of the tire 13.

A fuel solution introducing method for introducing the fuel solution F into the tire 13 will now be described.

Figure 8:
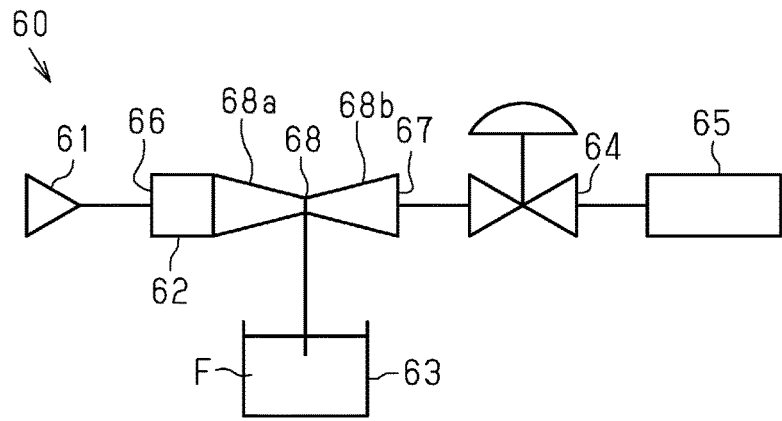
FIG. 8 is a schematic diagram of a gas introducing device.

As shown in FIG. 8, a gas introducing device 60 is used to introduce the fuel solution F. The gas introducing device 60 is a device such as an air inflator or an air carry tank used to introduce gas into the tire 13. The gas introducing device 60 includes a compressor 61, a Venturi tube 62, a reservoir 63, a pressure regulating valve 64, and an air chuck 65.

The compressor 61 compresses and discharges gas. Gas is, for example, air. The Venturi tube 62 includes an inlet port 66, an outlet port 67, and a constriction 68. The inlet port 66 is connected to the compressor 61. The inlet port 66 is connected to the pressure regulating valve 64. The constriction 68 is arranged between the inlet port 66 and the outlet port 67. The constriction 68 is where the tube cross-sectional area is narrowed. The constriction 68 includes a first portion 68a, in which the tube cross-sectional area gradually decreases from the inlet port 66 toward the outlet port 67, and a second portion 68b, in which the tube cross-sectional area gradually increases from the first portion 68a toward the outlet port 67. The constriction 68 is connected to the reservoir 63. The reservoir 63 stores the fuel solution F.

The pressure regulating valve 64 is a regulator that sets the pressure of a supplied fluid to a predetermined value and then discharges the fluid. The pressure regulating valve 64 is connected to the air chuck 65. The air chuck 65 is attached to the tire valve 19.

When the gas introducing device 60 is used to introduce gas into the tire 13, the air chuck 65 is attached to the tire valve 19. When the compressor 61 is driven in this state, the gas discharged from the compressor 61 flows into the Venturi tube 62.

The flow speed of gas that has flowed from the compressor 61 into the Venturi tube 62 increases at the constriction 68. As the flow speed increases, the pressure decreases, thereby generating negative pressure. The negative pressure causes the fuel solution F in the reservoir 63 to be drawn into the Venturi tube 62. The fuel solution F drawn into the Venturi tube 62 is mixed with gas. The gas in which the fuel solution F is mixed with the gas supplied from the compressor 61 flows out of the outlet port 67 of the Venturi tube 62.

The fluid supplied from the gas introducing device 60 is supplied through the air chuck 65 to the tire valve 19 and then supplied from the tire valve 19 into the tire 13. This introduces gas into the tire 13 and introduces the fuel solution F into the tire 13.

As shown in FIG. 1, the receiver 40 includes a receiver controlling section 41, a receiver reception circuit 42, and a reception antenna 43. A warning device 44 is connected to the receiver controlling section 41. The receiver controlling section 41 is composed of a microcomputer including a receiver CPU 41a and a receiver memory section 41b (such as a ROM and a RAM). The receiver reception circuit 42 demodulates signals received from each transmitter 21 via the reception antenna 43 and outputs the demodulated signals to the receiver controlling section 41.

The receiver controlling section 41 acknowledges the state of the tire 13 from the data transmitted from the transmitter 21. When an anomaly occurs in any of the tires 13, the receiver controlling section 41 performs notification by using the warning device 44 (notification device). For example, the warning device 44 may be a device that notifies the user of the anomaly by sound, or illumination or blinking of light. Also, the receiver controlling section 41 may display the condition of the tire 13 on the display unit that the occupants of the vehicle 10 can visually recognize.

The receiver controlling section 41 recognizes from the flag included in the data that the power generation amount of the power generation element 29 is below the threshold value. When the power generation element 29 is below the threshold value, the receiver controlling section 41 notifies the occupant of the vehicle 10 that the power generation element 29 is below the threshold value. For example, the warning device 44 may perform notification. Alternatively, the display unit that the occupants of the vehicle 10 can visually recognize may display the notification. When the warning device 44 performs notification, the same warning device 44 as that used when an anomaly occurs in the tire 13 may be used. Alternatively, other warning devices may be used. That is, the warning device 44 that notifies the occupant of the vehicle 10 of an anomaly of the tire 13 may be the same as or different from the warning device that notifies the occupant of the vehicle 10 that the power generation amount of the power generation element 29 is insufficient.

Further, the receiver controlling section 41 transmits, to an electronic control unit 51, data related to a road surface state among the received data. The electronic control unit 51 is installed in the vehicle 10 to perform control related to onboard components. The electronic control unit 51 performs control related to, for example, automatic traveling of the vehicle 10. In the automatic driving of the vehicle 10, the traveling state of the vehicle 10 and the road surface state of a road where the vehicle 10 is traveling are required to be obtained. The electronic control unit 51 performs control related to automatic traveling using the road surface state detected by the transmitter 21.

The operation of the present embodiment will now be described.

When traveling of the vehicle 10 rotates the tire 13, the centrifugal force causes the fuel solution F to flow. The fuel solution F flows on the rear surface 16 of the tread portion 14 of the tire 13, which is located on the side opposite from the grounding surface 15. The openings 33 cause the fuel solution F to flow into the accommodation region S2 and cause the fuel solution F to flow out of the accommodation region S2. The fuel solution F passes through the fuel passage R.

The fuel solution F that has flowed into the attachment portion 31 is absorbed by the retainer 34 and temporarily retained in the retainer 34. Since the power generation element 29 is in contact with the retainer 34, the power generation element 29 is supplied with the fuel solution F from the retainer 34. The power generation element 29 is arranged in contact with the fuel solution F, which passes through the fuel passage R.

The power generation element 29 generates power through a chemical reaction with organic matter contained in the fuel solution F. The transmitter 21 is operated with power generated by the power generation element 29. The chemical reaction with the fuel solution F generates gas. This gas is carbon dioxide.

The life of the transmitter 21 can be easily lengthened when the power generation element 29 is used as the power source as compared to when only the battery is used as the power source. When only the battery is used as the power source, battery replacement is limited because the transmitter 21 is arranged in the tire 13 and the battery is molded with resin. Thus, the life of the transmitter 21 depends on the life of the battery, that is, the capacity of the battery.

When the power generation element 29 is a power source, the fuel solution F can be used to generate power. The fuel solution F can be stored using the inner space S1, which is a space in the tire 13. Further, the fuel solution introducing method using the gas introducing device 60 is performed to add the fuel solution F. Thus, as compared to when only the battery is used as a power source, the life of the transmitter 21 can be lengthened.

Particularly, in the present embodiment, when the transmitter 21 is used to detect the road surface state, the life of the transmitter 21 tends to decrease as the power consumption increases. More specifically, when the road surface state is not detected by the transmitter 21, that is, when only a temperature anomaly or a pressure anomaly of the tire 13 is detected, the detection result of the acceleration sensor 24 simply needs to be obtained intermittently. By contrast, when the road surface state is detected by the transmitter 21, the detection result of the acceleration sensor 24 needs to be obtained in a shorter interval than when the road surface is not detected. As the number of times the acceleration sensor 24 obtains the detection result increases, the power consumption increases. In this case, when only the battery is used as a power source, the life of the transmitter 21 tends to decrease. By using the power generation element 29, even when the road surface state is detected by the transmitter 21, the life of the transmitter 21 can be lengthened.

The advantages of the embodiment will now be described.

(1) The transmitter 21 operates with power generated by the power generation element 29. The power generation element 29 generates power through a chemical reaction with organic matter contained in the fuel solution F. Thus, the power generation element 29 can generate power without arranging a movable member like when a magnetostrictor is used. This eliminates the need for a movable member in order to generate power. Thus, the arrangement of the power generation element 29 limits a decrease in the durability of the transmitter 21.

(2) The transmitter 21 is arranged on the rear surface 16 of the tread portion 14 of the tire 13. When the tire 13 rotates, the fuel solution F flows on the rear surface 16 of the tread portion 14 and is thus easily supplied to the power generation element 29.

(3) The power generation element 29 is arranged in contact with the fuel solution F, which passes through the fuel passage R. Thus, the fuel solution F can be easily supplied to the power generation element 29.

(4) The power generation element 29 is arranged along the retainer 34. By retaining the fuel solution F with the retainer 34, the fuel solution F can be easily supplied to the power generation element 29.

(5) The data transmitted by the transmitter 21 includes information related to the power generation amount of the power generation element 29. This allows the receiver 40 to recognize the information related to the power generation amount of the power generation element 29. In the present embodiment, the receiver 40 is caused to recognize that the power generation amount of the power generation element 29 is below the threshold value.

(6) When the power generation element 29 generates power, carbon dioxide is generated. When the power generation element 29 generates power, gas in the tire 13 can be added. This limits a decrease in the pressure of the tire 13.

The present embodiment may be modified as follows. The present embodiment and the following modifications can be combined as long as the combined modifications remain technically consistent with each other.

The information related to the power generation amount of the power generation element 29 included in data may indicate a power generation amount [Wh].

The transmitter controlling section 25 does not have to incorporate information related to the power generation amount of the power generation element 29 into data. In this case, the receiver controlling section 41 may facilitate introduction of the fuel solution F using another method, for example, facilitate addition of the fuel solution F each time a predetermined time passes.

The retainer 34 does not have to be arranged.

The retainer 34 does not have to be held between the power generation element 29 and the tread portion 14. Instead, the retainer 34 may be arranged to cover the surroundings of the power generation element 29. Even in this case, the fuel solution F can be easily supplied to the power generation element 29.

As long as the opening 33 can cause the fuel solution F to flow into the attachment portion 31 and cause the fuel solution F to flow out of the attachment portion 31, the opening 33 may have any shape.

The attachment portion 31 does not have to include the opening 33. In this case, the power generation element 29 is arranged to be exposed to the inner space S1, for example, arranged to face the insertion hole 32.

As long as the transmitter 21 is arranged in the tire 13, the transmitter 21 does not have to be arranged on the rear surface 16 of the tread portion 14. For example, the transmitter 21 may be arranged integrally with the tire valve 19. In this case, the transmitter 21 may have a fuel passage. The fuel passage includes, for example, a receiving part that receives the fuel solution F and an inducting part through which the fuel solution F received at the receiving part is inducted to the power generation element 29. The fuel solution F induced by the inducting part is returned to the inner space S1 and then circulated. For example, the receiving part is arranged such that when the transmitter 21 is located at the vertically lower part of the tire 13, the receiving part can receive the fuel solution F falling from the vertically upper part of the transmitter 21. In the case of a traveling situation in which the vehicle 10 repeatedly travels and stops, the transmitter 21 can be located at the vertically lower part of the tire 13 when the vehicle 10 is stopped. This allows the fuel solution F to be easily supplied to the power generation element 29.

The transmitter 21 does not have to include the power storage device 28. Instead, the transmitter 21 may be directly operated with power generated by the power generation element 29.

The power generation element 29 may generate power with fuel other than glucose. For example, the power generation element 29 may generate power using, as fuel, reducing sugars other than glucose, substances having an aldehyde group, or alcohols. Reducing sugars include, for example, aldose, ketose, and disaccharide other than glucose. The substances including an aldehyde group include, for example, acrylic aldehyde, acetaldehyde, acetaldehyde=ethylene acetal, acetaldehyde=oxime, acetaldehyde=dimethyl acetal, terephthalaldehydic acid, pyruvic aldehyde, phenylacetaldehyde, and phthalaldehyde. The alcohols include, for example, ethanol, piperonyl alcohol, phenacyl alcohol, and benzyl alcohol.

The gas introducing device 60 may include a gas supply source that differs from the compressor 61. For example, instead of the compressor 61, the gas introducing device 60 may include a pump or a pressure-resistant container in which compressed gas is stored.

Figure 9:
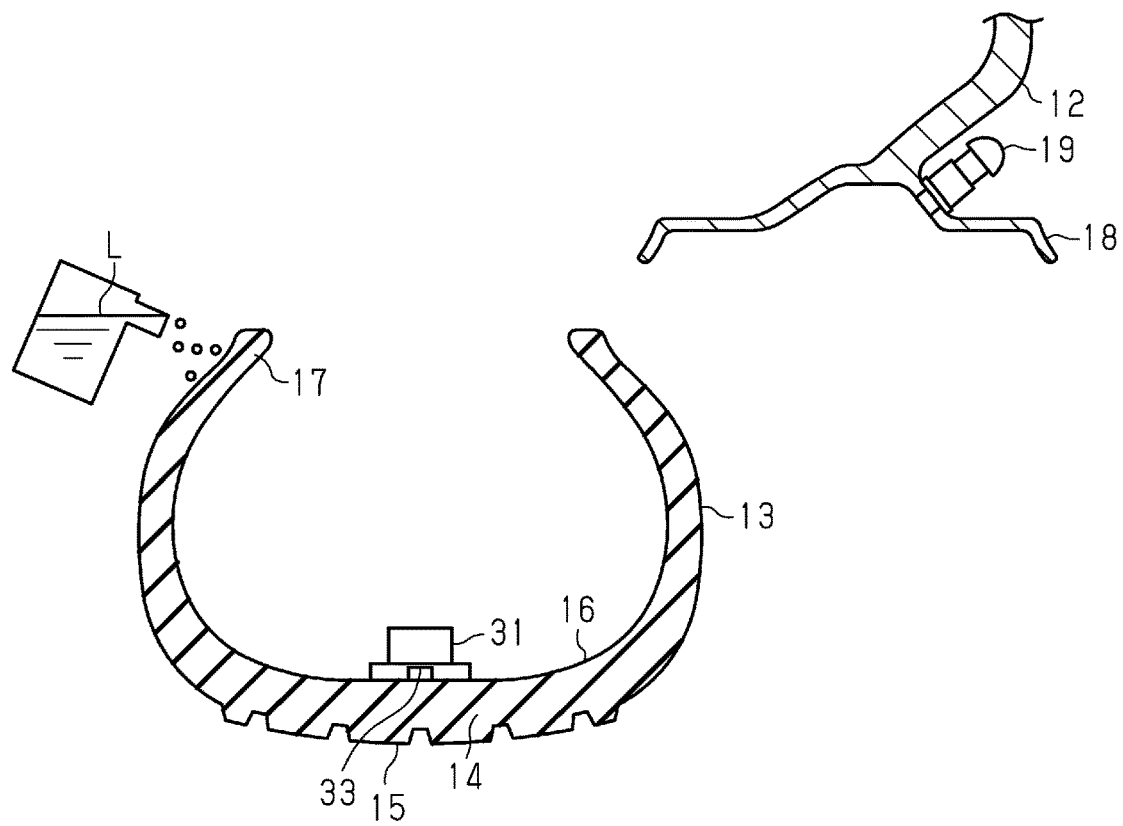
FIG. 9 is a diagram illustrating a fuel solution introducing method.

The fuel solution introducing method is not limited to the embodiment and may be performed in any manner. For example, as shown in FIG. 9, a fuel solution may be used as a lubricant L, which is used to attach the tire 13 to the wheel 12.

When the wheel 12 is attached to the tire 13, the lubricant L is applied to the bead 17 of the tire 13 in order to avoid a damage of the bead 17 of the tire 13 and smoothly fit the bead 17 of the tire 13 to the rim 18 of the wheel 12. The lubricant L is a liquid lubricant. The lubricant L can be used also as the fuel solution by dissolving fuel into the lubricant L and blending the fuel solution F of the present embodiment. The lubricant L is used to attach the tire 13 to the wheel 12.

When the tire 13 is attached to the wheel 12, some of the lubricant L is stored in the tire 13. Thus, when the fuel solution is used as the lubricant L, the fuel solution can be introduced into the tire 13.

The number of detection axes of the acceleration sensor 24 may be changed. For example, when the traveling of the vehicle 10 is detected using the acceleration sensor 24, only the centrifugal acceleration needs to be detected using the acceleration sensor 24.

The transmitter 21 does not have to detect the road surface state.

The transmitter controlling section 25 may transmit data after the pressure of the tire 13 detected by the pressure sensor 22 increases by a predetermined value or more per unit of time. The predetermined value may be set to, for example, a value larger than a pressure increase value of the tire 13 that results from a temperature increase caused when the vehicle 10 is traveling. Further, the predetermined value is set to a value smaller than a pressure increase value obtained when gas is introduced into the tire 13 and a pressure increase value obtained when the tire 13 is attached to the wheel 12. This causes data to be transmitted from the transmitter 21 to the receiver 40 when gas is introduced into the tire 13 and the tire 13 is attached to the wheel 12. The fuel solution F is introduced into the tire 13 when gas is introduced into the tire 13 or when the tire 13 is attached to the wheel 12. Thus, after the fuel solution F is introduced, data is transmitted from the transmitter 21 to the receiver 40. The data includes a flag, which is data indicating information related to the power generation amount of the power generation element 29. When the fuel solution F is normally introduced, the power generation amount of the power generation element 29 becomes greater than or equal to the threshold value. By contrast, when the fuel solution F is not normally introduced, the power generation amount of the power generation element 29 may be below the threshold value. When the power generation amount of the power generation element 29 is below the threshold value, notification is performed by the warning device 44 or the like. Thus, by transmitting the data from the transmitter 21 to the receiver 40 after the fuel solution F is introduced, the occupant of the vehicle 10 can check whether the fuel solution F is normally introduced.

The transmitter 21 only needs to include one of the pressure sensor 22 and the temperature sensor 23, which detect the state of the tire 13, and the acceleration sensor 24, which detects the road surface state or detects traveling of the vehicle 10. Further, the transmitter 21 may include sensors other than the pressure sensor 22, the temperature sensor 23, and the acceleration sensor 24.

The vehicle 10 may be a motorcycle or a vehicle having five or more wheel assemblies 11.

The receiver may be a mobile terminal carried by the occupant of the vehicle 10.

DESCRIPTION OF REFERENCE CHARACTERS

F . . . Fuel Solution; R . . . Fuel Passage; 12 . . . Wheel; 13 . . . Tire; 14 . . . Tread Portion; 15 . . . Grounding Surface; 16 . . . Rear Surface; 17 . . . Bead; 21 . . . Transmitter; 22 . . . Pressure Sensor (Sensor); 23 . . . Temperature Sensor (Sensor); 24 . . . Acceleration Sensor (Sensor); 25 . . . Transmitter Controlling Section (Obtaining Section and Generating Section); 26 . . . Transmission Circuit (Transmitting Section); 29 . . . Power Generation Element (Organic Power Generation Element); 34 . . . Retainer; 40 . . . Receiver

The invention claimed is:

1. A transmitter arranged in a tire attached to a wheel and configured to transmit data to a receiver, the transmitter comprising:
a sensor;
circuitry configured to obtain a detection result of the sensor and generate the data including the detection result of the sensor;

transmission circuit configured to transmit the data generated by the circuitry; and an organic power generation element that is a power source of the transmitter, wherein the organic power generation element is configured to generate power through a chemical reaction with organic matter contained in a fuel solution accommodated in the tire.

2. The transmitter according to claim 1, wherein the organic matter includes a reducing sugar.

3. The transmitter according to claim 1, wherein
the tire includes a tread portion having a grounding surface and a rear surface located at a side opposite from the grounding surface, and
the transmitter is arranged on the rear surface of the tread portion.

4. The transmitter according to claim 1, wherein
the tire includes a fuel passage through which the fuel solution passes, and
the organic power generation element is arranged in contact with the fuel solution passing through the fuel passage.

5. The transmitter according to claim 1, wherein
the tire includes a retainer that retains the fuel solution, and
the organic power generation element is arranged along the retainer.

6. The transmitter according to claim 1, wherein the circuitry is configured to generate the data including information related to a power generation amount of the organic power generation element.

7. The transmitter according to claim 6, wherein the circuitry is configured to determine whether the power generation amount of the organic power generation element is below a threshold value, and
when determining that the power generation amount of the organic power generation element is below the threshold value, generate the data including information indicating that the power generation amount is below the threshold value.

8. The transmitter according to claim 1, wherein the transmitter is arranged in the tire such that the organic power generation element is in contact with the fuel solution flowing in the tire with rotation of the tire.

* * * * *